Nov. 24, 1964           F. J. SITES           3,158,673

INSTANTANEOUS MULTIPLE PLOTTER AND VISUAL READOUT DEVICE

Filed March 10, 1961           3 Sheets-Sheet 1

INVENTOR.
FRANK J. SITES
BY
ATTORNEY
AGENT

Nov. 24, 1964    F. J. SITES    3,158,673
INSTANTANEOUS MULTIPLE PLOTTER AND VISUAL READOUT DEVICE
Filed March 10, 1961    3 Sheets-Sheet 2

INVENTOR.
FRANK J. SITES
BY
ATTORNEY
AGENT

Nov. 24, 1964 F. J. SITES 3,158,673
INSTANTANEOUS MULTIPLE PLOTTER AND VISUAL READOUT DEVICE
Filed March 10, 1961 3 Sheets-Sheet 3

INVENTOR.
FRANK J. SITES
BY
ATTORNEY
AGENT

United States Patent Office 3,158,673
Patented Nov. 24, 1964

3,158,673
INSTANTANEOUS MULTIPLE PLOTTER AND
VISUAL READOUT DEVICE
Frank J. Sites, U.S. Air Force, 29B Boatner, Eglin
Village, Eglin A.F.B., Fla.
Filed Mar. 10, 1961, Ser. No. 94,953
1 Claim. (Cl. 88—1)
(Granted under Title 35, U.S. Code (1952), sec. 266)

The invention described herein may be manufactured and used by or for the United States Government for governmental purposes without payment to me of any royalty thereon.

The purpose of this invention is to provide a high speed plotting device capable of receiving coordinate information in digital form, plotting the points represented by the coordinate information and providing a nondestructive visual read-out of the plotted information. Briefly, each point is plotted by changing the magnetic state of a minute area of a thin magnetic film, using coincident current techniques with an array of small rod-like magnets situated beneath the film. The Kerr magneto-optic effect is employed to obtain the nondestructive visual readout of the plotted information. This involves illuminating the magnetic film with collimated plane polarized light and observing the image formed on a viewing screen by the reflected light after it has passed through an analyzer. A feature of the invention is the use of a mask in conjunction with the viewing screen to reduce the background illumination and thus increase the contrast in the viewed image.

Figure 1:
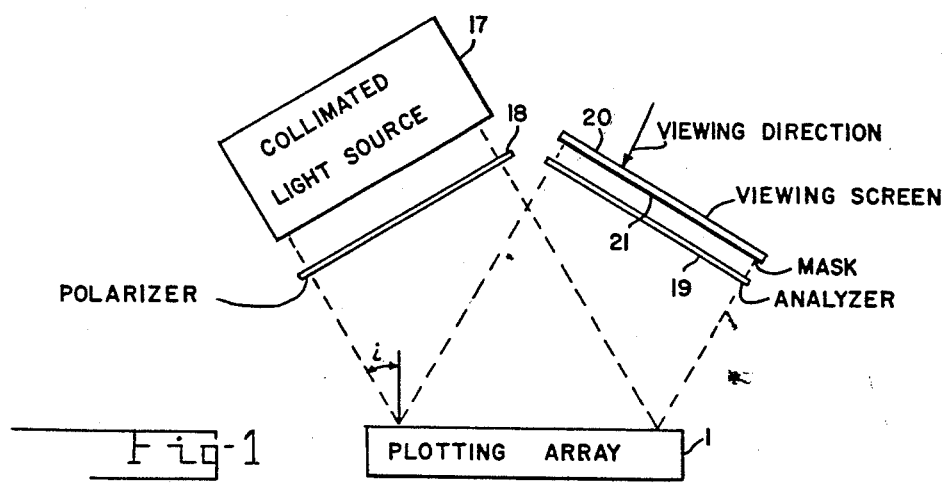
Figure 2:
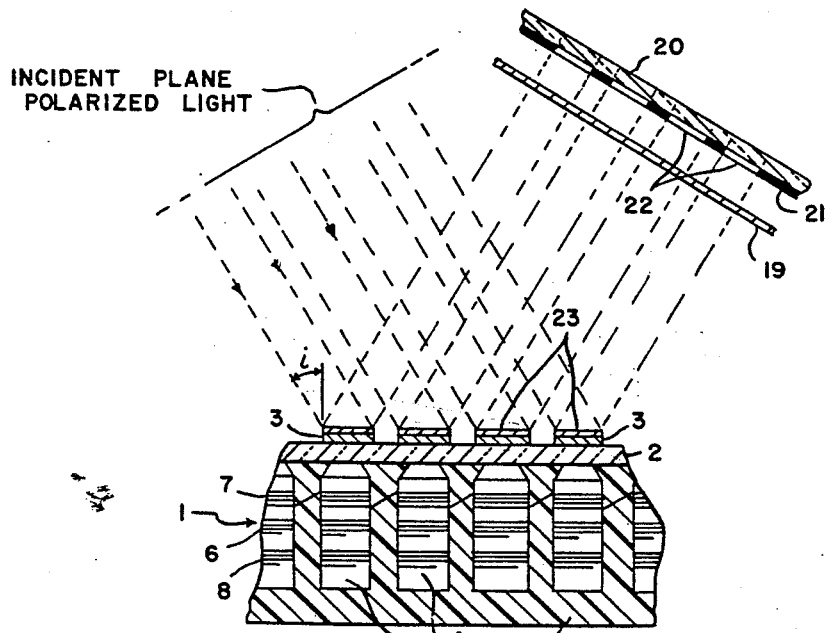
Figure 3:
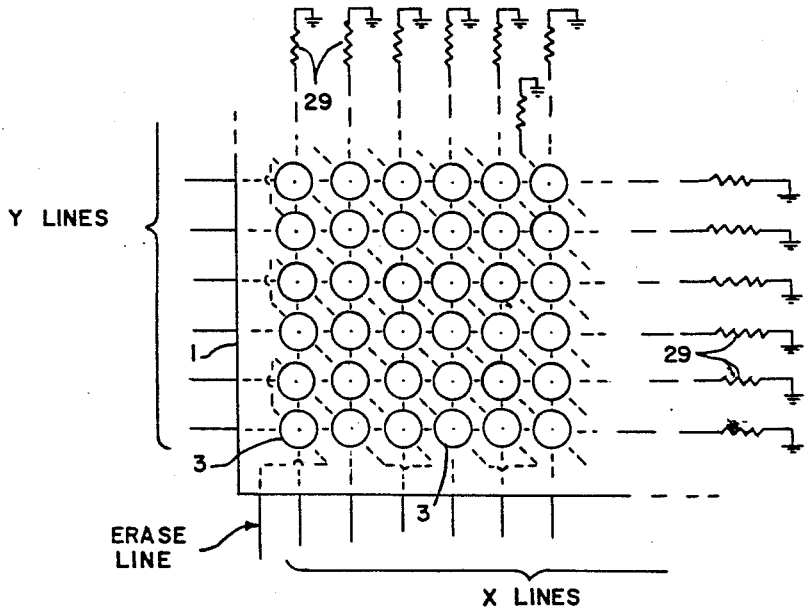
Figure 2A:
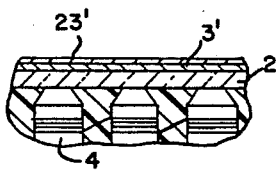
Figure 4:
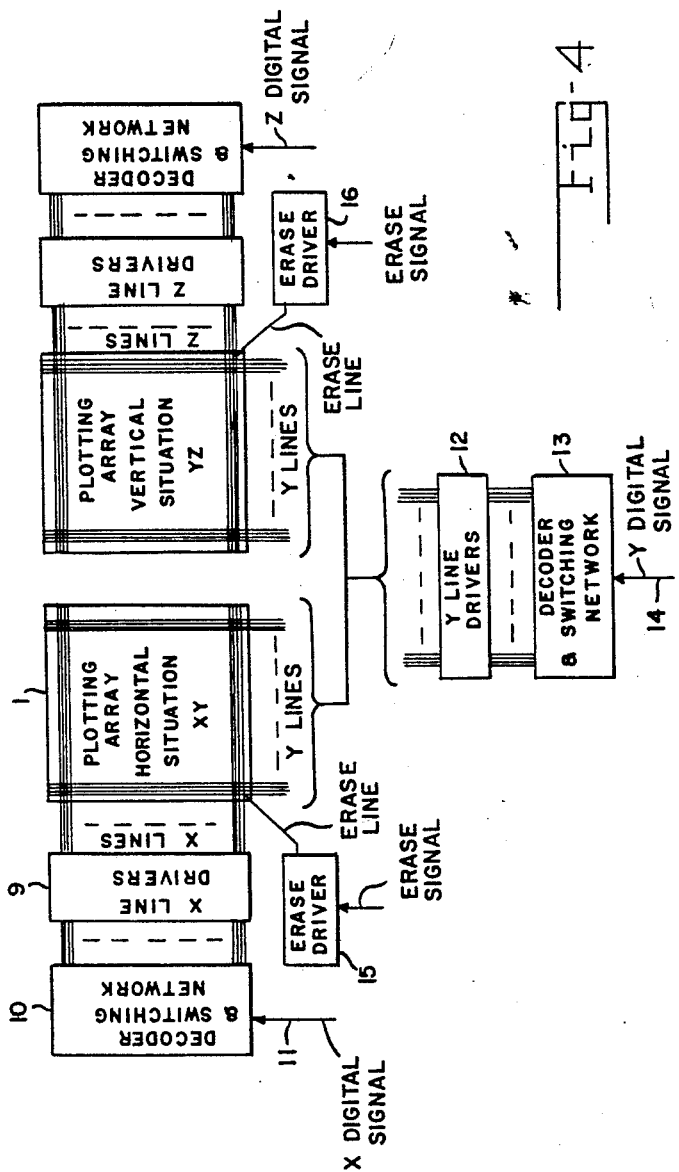

The invention will be explained in more detail in connection with the specific embodiment thereof shown in the accompanying drawings in which FIG. 1 shows schematically the general arrangement of the plotting device, FIGS. 2 and 2a are detailed enlargement of parts of the plotting device, FIG. 3 illustrates the electric circuits for controlling the magnetization of the individual magnets in the magnet array, and FIG. 4 shows schematically horizontal and vertical plotting arrays with their digital inputs and erasing circuits.

Referring to the drawings, the plotting array 1 of FIG. 1 is constructed in the manner shown in the enlarged detail of FIG. 2, which is not drawn to scale. A flat glass substrate 2 has deposited upon it, as by condensation from the vapor phase in a vacuum, a large number of minute areas 3 of a thin film of a suitable magnetic material such as the metallic compound MnBi (manganese-bismuth) or the metallic compound NiFe (nickel-iron). The film thickness is such as to give single magnetic domains, that is, a thickness of 1000–3000 Angstroms. A plan view of a portion of the top surface of the plotting array is shown in FIG. 3. The size of the areas 3 and their spacing will be determined by the overall size of the array and the resolution required. Instead of discrete film areas 3 a continuous film 3' may be used as shown in FIG. 2a.

Situated beneath the substrate 2 is an array of small rod-like magnets 4 which may be embedded in a suitable plastic 5. Substrate 2 should be as thin as practicable in order to reduce the gap between the magnets 4 and the magnetic film. There are as many magnets as there are film areas 3, each magnet situated directly beneath a film area. These magnets are made preferably of a magnetic material having a rectangular hysteresis loop, i.e., they may be switched abruptly from one magnetic polarity to the other by a small increment of magnetomotive force above a predetermined value. In order to permit selective switching of the polarities of the magnets, each magnet is equipped with an $x$ winding 6, a $y$ winding 7 and an erase winding 8. As shown in FIG. 3, the $x$ windings of all the magnets in each vertical row are connected in series in an $x$ line. When a voltage pulse is applied between any $x$ line and ground a pulse of current flows through the series connected coils of the particular line and through the resistor 29 to ground, applying equal magnetomotive forces in the same direction to all magnets in the row. Similarly, the $y$ windings 7 of all magnets in each horizontal row are connected in series in a $y$ line. A voltage pulse applied between any $y$ line and ground applies equal and similarly directed magnetomotive forces to all magnets in the row. The erase windings 8 of all magnets in the array are connected in series in the erase line, and a voltage pulse applied between the erase line and ground sends a pulse of current through all erase windings applying magnetomotive forces of equal magnitudes in the same direction to all magnets.

The arrangement for energizing the $x$, $y$ and erase lines is illustrated schematically in FIG. 4. The $x$ lines are driven by $x$ line drivers 9, the appropriate driver being selected by decoder and switching network 10 in accordance with the $x$ signal applied in digital form over line 11. The $y$ lines are energized in a similar manner by $y$ line drivers 12 which are controlled by decoder and switching network 13 in accordance with the $y$ digital signal applied on line 14. The erase lines are energized by erase line drivers 15 and 16 in response to an applied erase signal. The magnetomotive force applied to any magnet by energizing a line in circuit with one of the magnet coils is dependent upon the line current and the number of turns in the winding. The circuit constants are so chosen that the magnetomotive force produced by the erase line current is sufficient to switch the polarity of a magnet, but that produced by an $x$ or a $y$ line current is only one-half the amount required to switch a magnet. Therefore, coincident currents in both the $x$ and $y$ windings of a magnet are required to switch its magnetic polarity. It is also arranged that the magnetomotive force produced by the erase line current acts oppositely on the magnets to the forces produced by the $x$ and $y$ line currents. Defining the polarity of a magnet 4 as positive when its upper end is a north pole and negative when its upper end is a south pole, and assuming the plotting array to be in an erased state when all magnets have negative polarity, the simultaneous application of $x$ and $y$ coordinate signals to lines 11 and 14 causes the corresponding $x$ and $y$ lines to be energized and the magnet 4 that is common to the energized lines to be switched from negative to positive polarity. In this manner the point represented by the $x$ and $y$ signals is plotted magnetically on the plotting array 1. The application of an erase signal to the erase driver 15 causes the erase line to be energized and all magnets having positive polarity to be switched to negative polarity, thus erasing the plotted information.

Visual read-out of the magnetically plotted information is achieved optically by a method that utilizes the Kerr magnetoptic effect. This effect is the rotation of the plane of polarization of plane polarized light upon reflection from a magnetized surface when the magnetic vector at the surface has a component in the direction of propagation of the light. The direction of rotation depends upon the magnetic polarity of the reflecting surface. As will be apparent from FIGS. 2 and 2a the magnetic vector is substantially normal to the film 3 or 3'.

The general arrangement of the read-out apparatus is shown in FIG. 1. Collimated light from light source 17 is intercepted by a polarizer 18 so that the light passing the polarizer and incident upon the upper surface of the plotting array is plane polarized. The plane of polarization should lie in or be normal to the plane of incidence. Light reflected from the surface of the plotting array is intercepted by a second polarizer, or analyzer, 19. The light passing analyzer 19 impinges upon the viewing screen 20, which may be a ground glass or other light dispersing screen or a fluorescent screen, producing an optical image of the information magnetically recorded on the plotting array for visual observation or photographic recording.

Considering the read-out apparatus in more detail, the incident plane polarized light has its plane of polarization rotated upon reflection from the magnetized film areas 3, or from the magntized areas of the continuous film 3′ (FIG. 2a), in accordance with the above mentioned Kerr magneto-optic effect. Since the amount of rotation depends upon the magnitude of the component of the magnetic vector in the direction of propagation of the light, the angle of incidence $i$ should be made as small as possible. As stated above, the direction of the rotation depends upon the magnetic polarity of the reflecting surface. The plane of polarization therefore is rotated in one direction when the reflecting film has negative magnetic polarity and is rotated in the opposite direction by an equal amount when the reflecting film has positive polarity. Adopting, as before, negative polarity as the erased state of an elemental area, the analyzer 19 is oriented to extinguish light reflected from an elemental area in this state. Therefore, elemental film areas whose magnetic polarity has been changed to positive in the already described magnetic plotting process rotate the plane of polarization of the incident light away from extinction by twice the Kerr angle. Consequently, light reflected from these areas is not extinguished by the analyzer 19 and strikes the viewing screen 20 to produce a visual image of the plotted information.

Light reflected from nonmagnetized areas of the array undergoes no Kerr rotation and therefore would not be completely extinguished by analyzer 19. To prevent this light from reaching screen 20 and reducing the contrast of the visual image, a mask 21 is positioned to intercept the reflected light before it reaches the screen. This mask, which may conveniently be applied to the underside of screen 20, using photoetching techniques, for example, is provided with openings 22 which permit only the light reflected from the elemental magnetized areas to reach the screen.

A known method of enhancing the Kerr effect consists in coating the magnetized film surfaces with a thin transparent film of a dielectric such as silicon monoxide, SiO. This film, shown at 23 and 23′ in FIGS. 2 and 2a, is applied by vapor deposition in a vacuum to a thickness of about 1000 Angstroms. A better than fivefold increase in the Kerr angle may be obtained with this method using SiO as the dielectric, which considerably improves the contrast in the visual image. This method was reported by J. Kranz in "The Magnification of the Magneto-Optic Kerr Rotation by Means of Evaporated Layers," Naturwissenschaften, vol. 43, p. 370 (1956), and by W. Heinrich in "The Magnification of the Magneto-Optic Kerr Rotation by Means of Evaporative Layers," Sitzungsberichte der Bayerischen Akademie der Wissenschaften, Mathematisch-Naturwissenschaftliche Klasse, pp. 133–185 (1956).

For three-dimensional plotting two plotting arrays of the above described type may be used, one showing the horizontal or $xy$ situation and the other the vertical or $yy$ situation. The $yy$ array and its associated circuits for receiving $y$ and $z$ digital signals and magnetically plotting the position of a point in the $xy$ plane in accordance therewith are similar in all respects to the $xy$ apparatus described above. The optical read-out method disclosed in FIGS. 1 and 2 is, of course, used with the two plotting arrays of FIG. 4.

I claim:

A plotting device for receiving rectangular coordinate information in digital form and producing a visual plot of the points represented by said digital information, comprising: means providing a flat plotting surface having thereon a large number of minute closely spaced areas of magnetic material in a thin film, said film areas having different coordinates relative to a pair of rectangular coordinate axes on said surface; magnetizing means beneath said surface and individual to each film area for equally magnetizing the film areas with the magnetic vector at right angles to said surface, said magnetizing means normally magnetizing said film areas with the same predetermined polarity; decoding and switching means electrically coupled to said magnetizing means and having a first input circuit for digital signals representing film area coordinates along one of said axes and a second input circuit for digital signals representing film area coordinates along the other of said axes, said decoding and switching means operating in response to input signals representing the coordinates of a particular film area to reverse the magnetic polarity of the magnetizing means associated with said film area and thereby the magnetic polarity of said film area; means for illuminating the entire said plotting surface with collimated plane polarized light at an angle of incidence such that said magnetic vector has a substantial component in the direction of light propagation; a light dispersing viewing screen positioned to receive all of the light reflected from said plotting surface; an analyzer situated to intercept the reflected light before reaching said screen, said analyzer being oriented to extinguish the light reflected from film areas having said predetermined magnetic polarity; and a mask situated to intercept the reflected light before it reaches said screen, said mask having openings so positioned as to permit the light reflected from the magnetized film areas to reach said screen but to block light reflected from all other areas of said plotting surface from said screen.

References Cited by the Examiner

UNITED STATES PATENTS

| 2,787,188 | 4/57 | Berger. | |
|---|---|---|---|
| 2,984,825 | 5/61 | Fuller et al. | 88—61 |
| 3,059,538 | 10/62 | Sherwood et al. | 88—61 |

OTHER REFERENCES

Williams et al.: Magnetic Writing on Thin Films of MnBi, Journal of Applied Physics, vol. 28, No. 10, pp. 1181–1184, October 1957.

JEWELL H. PEDERSEN, *Primary Examiner.*

EMIL G. ANDERSON, *Examiner.*